(12) United States Patent
Daniel et al.

(10) Patent No.: US 6,447,829 B1
(45) Date of Patent: Sep. 10, 2002

(54) ICE CONFECTION

(75) Inventors: Adrian Daniel; Jon Richard Oldroyd, both of Bedford (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 09/521,583

(22) Filed: Mar. 9, 2000

(30) Foreign Application Priority Data

Mar. 10, 1999 (GB) .............................. 9905524
Jul. 23, 1999 (EP) .............................. 99305842

(51) Int. Cl.[7] .............................. A23G 9/02
(52) U.S. Cl. ............... 426/565; 426/101; 426/524; 426/656
(58) Field of Search ............... 426/565, 101, 426/524, 656, 660; 530/350

(56) References Cited

U.S. PATENT DOCUMENTS

| | | | |
|---|---|---|---|
| 3,969,531 A | | 7/1976 | Cornelius |
| 4,738,862 A | | 4/1988 | Bee |
| 4,826,656 A | | 5/1989 | Huber et al. |
| 5,620,732 A | * | 4/1997 | Clemmings et al. |
| 6,017,574 A | * | 1/2000 | Clemmings et al. |
| 6,090,917 A | * | 7/2000 | Lillford et al. |
| 6,096,867 A | * | 8/2000 | Byass et al. |
| 6,156,880 A | * | 12/2000 | Lillford et al. |
| 6,162,789 A | * | 12/2000 | Lillford et al. |
| 6,200,622 B1 | * | 3/2001 | Clemmings et al. |

FOREIGN PATENT DOCUMENTS

| | | |
|---|---|---|
| DE | 197 32 132 A1 | 1/1998 |
| DE | 197 32 135 A1 | 2/1998 |
| EP | 0 843 010 A1 | 5/1998 |
| GB | 915 389 | 1/1963 |
| GB | 1050213 | 12/1966 |
| GB | 1313807 | 4/1973 |
| GB | 2315662 A | 2/1998 |
| GB | 2315753 A | 2/1998 |
| GB | 2328136 A | 2/1999 |
| JP | 80013708 | 4/1980 |
| WO | 92/25581 | 12/1992 |
| WO | 96/39878 | 12/1996 |
| WO | 97/02342 | 1/1997 |
| WO | WO 98/04146 * | 2/1998 |
| WO | 98/04147 | 2/1998 |
| WO | 98/04148 | 2/1998 |
| WO | 98/04699 | 2/1998 |
| WO | 98/22591 | 5/1998 |
| WO | 95/41109 | 9/1998 |
| WO | 98/41106 | 9/1998 |
| WO | 99/38386 | 8/1999 |

OTHER PUBLICATIONS

"Antifreeze Proteins And Their Potential Use In Frozen Foods", Marilyn Griffith and K. Vanya Ewart, Biotechnology Advances, vol. 13, No. 3, pp. 375–402, 1995.

"Low Temperature Sugar–Water Equilibrium Curve By A Rapid Calorimetric Method", B. de Cindio, S. Correra & V. Hoff, Journal of Food Engineering, vol. 24 (1995), pp. 405–415.

(List continued on next page.)

Primary Examiner—Nina Bhat
(74) Attorney, Agent, or Firm—Gerard J. McGowan, Jr.

(57) ABSTRACT

An ice confection product having a volume of from 1 to 20 ml and a thickness of greater than 5 mm comprising an antifreeze protein, wherein $\Delta$ modulus/original modulus $\geq 0.4$, and/or $\Delta$ strength/original strength $\geq 0.4$; providing that when $\Delta$ modulus/original modulus $\leq 6.0$, $\Delta$ modulus $\geq 50$ MPa, and/or when $\Delta$ strength/original strength $\leq 2.0$, $\Delta$ strength $\geq 0.2$ MPa. Such ice confection products have properties which are akin to boiled sweets. Such products cannot be bitten or chewed but must be sucked, resulting in a product which remains in the mouth longer and is more refreshing.

8 Claims, 5 Drawing Sheets

OTHER PUBLICATIONS

"A Low–Temperature Scanning Electron Microscopy Study Of Ice Cream, Techniques and General Microstructure", K.B. Caldwell, H.D. Goff and D.W. Stanley, Food Structure, vol. 11 (1992), pp. 1–9.

"Unbiased Estimation Of The Euler–Poincare Characteristic", B. Pinnamaneni, C. Lantuéjoul , J. Jernot and J. Chermant, Acta Stereol, 1989; 8/2, pp. 101–106.

* cited by examiner

ICE CONFECTION

TECHNICAL FIELD OF THE INVENTION

The invention relates to novel ice confections. In particular the invention relates to novel ice confections containing an antifreeze protein.

BACKGROUND OF THE INVENTION

It is highly desirable to be able to manufacture ice confections having novel shapes, properties and/or textures. Until now, however the ability to provide such a high degree of novelty and interest to the products has been limited. In particular products have to be manufactured with the ability to survive packaging, storage and distribution.

In the confectionery industry sweets such as boiled sweets and gobstoppers are very popular. However to date it has not been possible to reproduce such products within a frozen confection.

The problem in preparing such frozen ice confection products is that when they are made of conventional frozen confectionery mixtures, for example water ice mixtures or ice cream mixes, they do not have the desired eating characteristics. In particular such products tend to be rather wet at their surface, relatively soft to eat and not long lasting in the mouth. Also these products often cannot be co-packed as they tend to stick together during storage.

We have now shown that inclusion of specific antifreeze proteins into selected ice confections results in the formation of a strong, close-packed continuous network of ice crystals within the ice confection. As a result the ice confection is provided with specific defined mechanical properties. In particular the ice confection becomes hard and once of a certain dimension becomes difficult to bite or chew, but must be sucked, exactly like a boiled sweet of the confectionery industry.

WO 98/04146 (Unilever) discloses that AFPs can be incorporated into frozen food products such as ice confections to provide desirable product properties providing that the product and processing conditions are varied such that the ice crystals provided in the product have an aspect ratio of more than 1.9, preferably from 1.9 to 3.0. The specific examples given are all aerated ice cream compositions. As shown by comparative Examples A to C below, the addition of antifreeze proteins to aerated ice cream does not significantly change the mechanical properties of the ice cream. WO 98/04146 does not teach that it is possible to provide specific ice confection products having novel mechanical properties and that such ice confections enable an ice confection equivalent to a boiled sweet to be manufactured.

WO 96/39878 (The Pillsbury Company) discloses a method for making a frozen composition for storage, the method not requiring a hardening step prior to storage. The frozen composition contains an antifreeze protein, in particular Type I AFP. Examples show the preparation of an aerated ice cream and an aerated frozen yogurt. As shown by comparative Examples A to C below, the addition of anti-freeze proteins to aerated ice cream does not significantly change the mechanical properties of the ice cream. WO 96/39878 does not teach that it is possible to provide specific ice confection products having novel mechanical properties and that such ice confections enable an ice confection equivalent to a boiled sweet to be manufactured.

U.S. Pat. No. 5,118,792 (Warren et al) discloses the addition of fusion proteins, and in particular the fusion protein protein A-Saf5 into foods which are to be consumed frozen, for example, ice cream, frozen yogurt, ice milk, sherbet, popsicles and frozen whipped cream. No examples are given where a final ice confection product is provided containing such fusion proteins. It is shown in Example 3B that when a popsicle formulation is used within the "splat assay", growth of the ice crystals is restricted.

Surprisingly we have now found that the addition of specific antifreeze proteins to defined ice confections, for example to water ices, ice milks, and unaerated ice cream, results in the formation of a strong, close-packed continuous network of ice crystals within the ice confection providing significant, advantageous changes to the mechanical properties of the ice confection. In particular an ice confection which is the frozen equivalent of the boiled sweet can be provided which has to be sucked and not bitten or chewed. As a result the product is retained for longer in the mouth and is found to be particularly refreshing.

DISCLOSURE OF THE INVENTION

Accordingly the invention provides an ice confection product having a volume of from 1 to 20 ml and a thickness of greater than 5 mm comprising an antifreeze protein, wherein $\Delta$ modulus/original modulus $\geq 0.4$, and/or $\Delta$ strength/original strength $\geq 0.4$, providing that when $\Delta$ modulus/original modulus $\leq 6.0$, $\Delta$ modulus $\geq 50$ MPa, and/or when $\Delta$ strength/original strength $\leq 2.0$, $\Delta$ strength $\geq 0.2$ MPa.

Preferably $\Delta$ modulus/original modulus $\geq 0.4$; providing that when $\Delta$ modulus/original modulus $\leq 6.0$, $\Delta$ modulus $\geq 90$ MPa.

Most preferably $\Delta$ modulus/original modulus $\geq 1.0$; providing that when $\Delta$ modulus/original modulus $\leq 6.0$, $\Delta$ modulus $\geq 100$ MPa.

Preferably $\Delta$ strength/original strength $\geq 0.7$, most preferably $\Delta$ strength/original strength $\geq 1.5$.

By modulus is meant the apparent elastic modulus (E) as determined using four point bend test. Example 1 gives the standard procedure for performing a four point bend test.

Therefore $\Delta$ modulus ($\Delta E$) means the change in modulus between two ice confections whose formulation and process of manufacture are identical in all respects except that the first ice confection includes in its composition an antifreeze protein, and the second ice confection has no antifreeze protein included in its composition (the control composition). Original modulus ($E_{orig}$) is the modulus measured in the control composition.

By strength is meant the flexure strength ($\delta_u$) which can be defined as the maximum stress that a material can withstand, under the particular conditions. The flexure strength is given by the stress at a point of maximum force on the force versus displacement curve recorded during a four point bend test.

Therefore $\Delta$ strength ($\Delta \delta_u$) means the change in strength between two ice confections whose formulation and process of manufacture are identical in all respects except that the first ice confection includes in its composition an antifreeze protein, and the second ice confection has no antifreeze protein included in its composition (the control composition). Original strength ($\delta_{u\ orig}$) is the modulus measured in the control composition.

In addition to changes in the apparent elastic modulus and flexure strength, an increase in product hardness is provided by the ice confections according to the invention.

For ice confections frozen with agitation, for example in an ice cream freezer (such as a scraped surface heat exchanger), the increase in hardness can be measured using the Vickers hardness test. Details of the Vickers hardness test are given in Example 3.

The degree to which the Vickers Hardness ($H_v$) of the ice confection is increased by the addition of the antifreeze protein depends in part on the ice content of the ice confection.

However, generally $\Delta H_v/H_{v\ orig} \geq 0.3$, providing that when $\Delta H_v/H_{v\ orig} \leq 5.0$, $\Delta H_v \geq 0.3$.

Preferably $\Delta H_v/H_{v\ orig} \leq 1.0$, providing that when $\Delta H_v/H_{v\ orig} \leq 5.0$, $\Delta H_v \geq 1.25$.

Most preferably either $\Delta H_v/H_{v\ orig} \geq 6.0$ or $\Delta H_v/H_{v\ orig} \leq 6.0$ and $\Delta H_v \geq 2.0$.

Where $\Delta H_v$ is the change in Vickers Hardness between two ice confections whose formulation and process of manufacture are identical in all respects except that the first ice confection includes in its composition an antifreeze protein, and the second ice confection has no antifreeze protein included in its composition (the control composition). $H_{v\ orig}$ is the original Vickers Hardness measured in the control composition.

By close-packed continuous network of ice crystals is meant that any given ice crystal is connected to at least one other ice crystal.

In unaerated ice confections which have been frozen with agitation, the degree of network formation can be measured as contiguity. Contiguity is defined as the ratio of the particle to particle interface area divided by the total interface area. It is thus a measure of the degree of network formation of the particle phase. Example 4 shows a method for the measurement of contiguity.

Unaerated ice confections according to the invention have a contiguity of at least 0.2, as measured by the test given in Example 4, for an ice content when measured at −18° C. of from 50–90%, preferably 54–85% by weight.

In unaerated ice confections which have been frozen by any means, the degree of network formation can be measured as the Euler-Poincare characteristic of the ice phase. The Euler-Poincare characteristic is a measure of the degree of network formation of a particular phase. The lower and more negative the value of the Euler-Poincare characteristic, the greater the continuity of the phase in question. Example 5 shows a method for the measurement of the Euler-Poincare characteristic Unaerated ice confections according to the invention have an ice phase Euler-Poincare characteristic of less than −150 mm$^{-2}$, as measured by the test given in Example 5, for an ice content of from 50–90%, preferably 54–85% by weight, when measured at −18° C.

Products according to the invention are typically of comparable size and similar shapes to boiled sweets or ice cubes, such as rectangular chunks, cubes, spherical balls, small pyramids, ellipsoidal shapes, small animal shapes etc.

Preferably the thickness of the product is at least 1 cm. Typically the thickness of the product will be in the range of from 1 to 4 cm, more preferred from 1.5 to 3 cm. Preferably the length of the product is at least 1 cm. Typically the length of the product is from 1.5 to 6 cm, more preferred from 2.5 to 5 cm.

Preferably the ice confectionery product has a volume of from 3 to 15 ml, more preferred from 5 to 15 ml.

The ice confectionery product of the invention may conveniently be sold in multi-packs like boiled sweets.

By antifreeze protein (AFP) is meant a protein which has significant ice recrystallisation inhibition properties as measured in accordance with Example 2. The AFP provides an ice particle size upon recrystallisation of less than 20 µm, more preferred from 5 to 15 µm.

Preferably the ice confection comprises at least 0.0005% by weight antifreeze protein, more preferably 0.0025% by weight antifreeze protein. Typically the ice confection will comprise from 0.0005% by weight to 0.005% by weight antifreeze protein.

For some applications it may be advantageous to include a mixture of two or more different AFPs into the food product.

The AFP for use in products of the invention can be any AFP suitable for use in food products. Examples of suitable sources of AFP are for example given in the article "Antifreeze proteins and their potential use in frozen food products", Marylin Griffith and K. Vanya Ewart, Biotechnology Advances, vol 13, pp375–402, 1995 and in patent applications WO 98/04699, WO 98/04146, WO 98/04147, WO 98/04148 and WO 98/22591.

The AFPs can be obtained from their sources by any suitable process, for example the isolation processes as described in the above mentioned documents.

One possible source of AFP materials is fish. Examples of fish AFP materials are antifreeze glycoproteins (AFGP) (for example obtainable from Atlantic cod, Greenland cod and Tomcod), Type I AFP (for example obtainable from Winter flounder, Yellowtail flounder, Shorthorn sculpin and Grubby sculpin), Type II AFP (for example obtainable from Sea raven, Smelt and Atlantic herring) and Type III AFP (for example obtainable from Ocean Pout, Atlantic wolffish, Radiated shanny, Rock gunnel and Laval's eelpout). A preferred example of the latter type is described in WO 97/02343.

Another possible source of AFP material are invertebrates. Also AFPs may be obtained from Bacteria.

A third possible source of AFP material are plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both natural occurring species may be used or species which have been obtained through genetic modification. For example micro-organisms or plants may be genetically modified to express AFPs and the AFPs may then be used in accordance to the present invention.

Genetic manipulation techniques may be used to produce AFPs. Genetic manipulation techniques may be used to produce AFPs having at least 80%, more preferred more than 95%, most preferred 100% homology to the AFPs directly obtained from the natural sources. For the purpose of the invention these AFPs possessing this high level of homology are also embraced within the term "AFPs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For some natural sources the AFPs may consist of a mixture of two or more different AFPs.

Preferably the antifreeze protein is chosen such that it gives an aspect ratio of more than 1.9 to the ice crystal, preferably from 1.9 to 3.0, more preferably from 2.0 to 2.9, even more preferred from 2.1 and 2.8 (see WO 98/04146). Aspect ratio is defined as the maximum diameter of a particle divided by its minimum diameter. The aspect ratio can be determined by any suitable method. A preferred method is illustrated in the Examples (Example 6).

For the purpose of the invention the preferred AFPs are derived from fish. Especially preferred is the use of fish proteins of the type III, most preferred HPLC 12 as described in our case WO 97/02343.

Ice confections which show the required change in mechanical properties on the addition of the antifreeze protein include unaerated milk containing frozen confections such as ice-cream, frozen yoghurt, and frozen custard, aerated and unaerated sherbet and milk ice, as well as aerated and unaerated frozen confections which do not typically contain milk such as water ices, sorbet, granitas and frozen fruit purees.

Preferably the ice confection is unaerated.

Preferably the ice confection is selected from a water ice and a milk ice.

The ice confection containing the antifreeze protein may constitute the entire product or may be a component of a composite product.

By water ice is meant a frozen solution made essentially from sugar, water, fruit acid or other acidifying agent, colour, fruit or fruit flavouring.

By unaerated is meant an ice confection having an overrun of less than 25% (equivalent to 0.2 volume fraction of air), preferably less than 10% (equivalent to 0.09 volume fraction of air). During the processing of the ice confection no deliberate steps such as whipping are undertaken to increase the gas content of the product. However, it should be realised that during normal methods for the preparation of non-aerated ice confections, low levels of gas or air may be incorporated into the product, for example due to the mixing conditions used.

The ice confection used will typically have an ice content of at least 30% by volume when measured at −18° C., more preferably at least 40% by volume when measured at −18° C., most preferably at least 50% by volume when measured at −18° C.

The ice content may be determined following the techniques described in the article by B de Cindio and S Correra in the Journal of Food Engineering, Volume 24, pages 405–415, 1995. The enthalpy data required for this technique is obtained using adiabatic calorimetry (Holometrix Adiabatic Calorimeter). The ice contents as expressed herein are measured on an 80 g sample poured into the sample holder of the calorimeter and cooled to −75° C. by placing the assembly in dry ice prior to placing in the calorimeter (pre-cooled to between −70° C. and −80° C.). The enthalpy data obtained was analysed to give ice content as a function of the temperature following the method of Cindio and Carrera.

Preferably the ice confection has a total soluble solids content of less than 40% by weight, preferably less than 25% by weight, most preferably less than 15% by weight. For low calorie products the total soluble solids content may be as low as, for example, approximately 5% by weight.

The total soluble solids content is measured at 4° C. and is the % by weight of the total composition that is dissolved at that temperature.

It has further been observed that products according to the invention retain their structural integrity for longer when held at ambient temperatures.

The ice confectionery product may be a composite product such as a product having 2 or more layers. For example an ice cream core may be coated with one or more layers of water ice. The different layers may be different flavours or colours. A further example would be a sweet composed of two different halves having a different flavour or colour. Each individual component may or may not include AFP. However, it is advantageous for the different components, and in particular components of a different colour or flavour, to include AFP in their composition. It has been observed that products according to the invention which contain AFP demonstrate excellent colour distinction, allowing multilayered products to be provided which demonstrate no merging of the different colours over time, even when the layers are relatively thin.

DESCRIPTION OF THE DRAWINGS

FIG. 3 shows a comparison of the apparent modulus measured for Example 9 compared to Comparative Examples A, B, & C and relevant control samples.

FIG. 4 shows a comparison of the flexure strength measured for Example 9 compared to Comparative Examples A, B, & C and relevant control samples.

FIG. 5 shows a comparison of the Vickers Hardness measured for Example 9 compared to Comparative Examples A, B, & C and relevant control samples.

FIG. 6 shows a comparison of the apparent modulus measured for Examples 10–13 compared with a control sample.

FIG. 7 shows a comparison of the flexure strength measured for Examples 10–13 compared with a control sample.

FIG. 8 shows a comparison of the Vickers Hardness measured for Examples 10–13 compared with a control sample.

FIG. 9 shows a comparison of the apparent modulus measured for Examples 14–17 compared with a control sample.

FIG. 10 shows a comparison of the flexure strength measured for Examples 14–17 compared with a control sample.

FIG. 11 shows the time taken for consumption of the products of Example 21.

EXAMPLES

The invention will now be illustrated by means of the following examples.

Example 1

Four point bend test

The standard four point bend test can be used to determine a number of mechanical properties of ice confection materials. The mechanical properties being measured are Young's modulus (apparent) and flexure strength.

Figure 1:
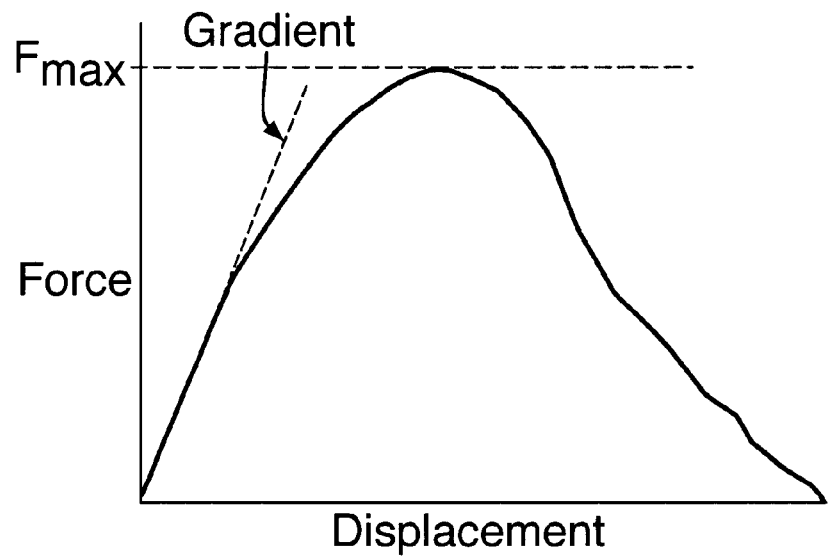
FIG. 1 shows a schematic of the data recorded during a four-point bend test.

In a bend test, a test piece is deformed whilst measuring the applied force and test piece deflection. A schematic data set for an ice confection is shown in FIG. 1. The apparent elastic modulus is determined by the gradient of the initial linear part of this curve.

The 4-point bend test requires production of a parallel sided rectangular bar of ice confection material. This may be obtained by any suitable means.

In this particular application the parallel sided rectangular bar of ice confection was made using aluminum moulds producing bars having the dimensions 25×25×200 mm.

a) Quiescent Frozen Ice Confections

The liquid ice confection pre-mix was poured into a mould which had been pre-cooled in a blast freezer at −35° C. for at least 30 minutes, the mould was then placed in a blast freezer at −35° C. for at least 2 hours. The samples were then de-moulded and stored at −25° C. until testing (conducted after 5–6 days). 18 to 24 hours prior to testing the samples were equilibrated by storing at −18° C., the temperature at which all tests were performed. A minimum of 10 bars was tested for each sample set and the mean value of each sample set was recorded as the value of the mechanical property being measured.

b) Ice Confections Frozen with Agitation

The ice confection was extruded from the ice cream freezer (scraped surface heat exchanger) at a temperature of from −1° C. to −5° C., depending on the ice confection, into a mould which had been pre-cooled in a blast freezer at −35° C. for at least 30 minutes, the mould was lined with silicon paper to prevent ice-metal adhesion. The sample was then prepared as above for quiescent frozen samples.

The general test applied to all types of solids is described in "Biomechanics Materials. A practical Approach" Ed. J. F. V. Vincent, Pub. IRL Press, Oxford University Press, Walton Street, Oxford, 1992 and "Handbook of Plastics Test materials" Ed. R. P. Brown, Pub. George Godwin Limited, The Builder Group, 1–3 Pemberton Row, Fleet Street, London, 1981. Testing involves placing each bar onto 2 supports and bending it until fracture by applying pressure from two upper supports, that are separated by 85 mm, centrally on the bar's top surface. The force applied in bending and the displacement of the moving contact are recorded throughout the test. The speed of descent of the moving support was 50 mm per minute.

The apparent elastic modulus of the material is given by the equation;

$$E = \frac{(0.21) \cdot gradient \cdot S^3}{BD^3}$$

where the gradient is that shown in FIG. 1, S is the span (distance) between the supporting contacts beneath the test bar, B is the width of the bar and D is the depth of the bar.

For these tests the span (S) was 170 mm.

With reference to FIG. 1, the strength of a material under three point bend conditions, is given as;

$$\sigma_u = \frac{(0.75) \cdot F_{max} S}{BD^2}$$

where $\delta_u$ is the flexure strength and $F_{max}$ is the maximum force recorded.

Example 2

Method of determining whether an AFP possesses ice recrystallisation inhibition properties.

Recrystallisation inhibition properties can be measured using a modified "splat assay" (Knight et al, 1988). 2.5 μl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30–60 minutes is similar or only moderately (less than 10%) increased compared to the size at t=0, and/or the crystal size is less than 20 micrometer, preferably from 5 to 15 micrometer this is an indication of good ice recrystallisation inhibition properties

Example 3

Standard Vickers Hardness test.

The Vickers Hardness test is an indentation test that involves pushing a pyramid shaped indentor into the surface of material and recording the force applied as a function of tip displacement. Force and displacement are measured during the indentation loading cycle and the unloading cycle.

The test is described in "Handbook of Plastics Test materials" Ed. R. P. Brown, Pub. George Godwin Limited, The Builder Group, 1–3 Pemberton Row, Fleet Street, London, 1981.

Figure 2:
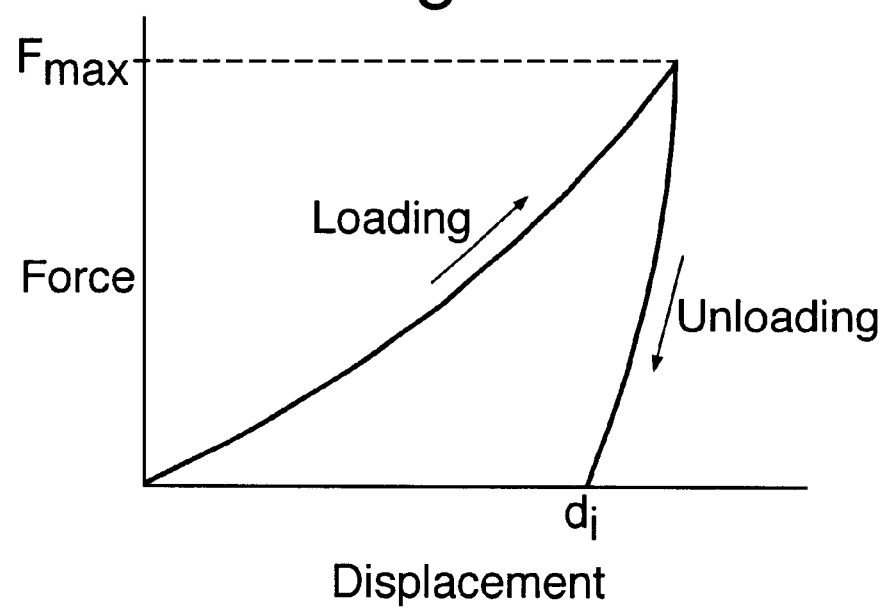
FIG. 2 shows a schematic diagram of typical force vs. displacement curve for a Vickers Hardness Test.

The Vickers pyramid geometry is an engineering industry standard (BSi 427, 1990). It has an apex angle at the tip of 136°. Hardness is determined as;

$$H_V = \frac{F_{max}}{A}$$

where $H_v$ is the Vickers Hardness, $F_{max}$ is the maximum applied force (see FIG. 2) and A is the projected area of the indentation left in the material's surface. The area $\Delta$ is determined by assuming the indentation has the same geometry as the indentor that formed it, i.e. a Vickers pyramid, and therefore the projected area can be determined from the indent depth given by $d_i$ in FIG. 2.

$$A = 24.5 d_i^2$$

The Vickers Hardness of a material is a measure of the material's resistance to plastic deformation.

The test samples were 500 ml blocks, manufactured by extruding the ice confection (typically at a temperature of from −1° C. to −5° C.) from a scraped surface heat exchanger into standard 500 ml packets and then placing the packets into a blast freezer at −35° C. for two hours prior to storage at −25° C. Prior to testing the samples were equilibrated overnight at the required test temperature of −18° C.

Measurements were conducted on a universal testing machine made by Instron (code 4500), within a temperature controlled cabinet at −18° C. The crosshead speed was 2.0 mm/min. The maximum load was 95N. The pyramid tip pushed into the surface of the material to a depth of 1.5 mm for a water ice and 2.5 mm for an ice cream.

Example 4
Measurement of Contiguity

Contiguity is measured using microstructural images of the ice confection using cryogenic scanning electron microscopy (SEM). Structures are imaged using the technique described in "A low temperature scanning electron microscopy study of ice cream. I. Techniques an general microstructure" Food Structure Vol. 11 (1992), pp 1–9.

In a particulate composite, the Contiguity of the particulate phase is defined as the ratio of the particle to particle interface area divided by the total internal interface area. It is a measure of the degree of network formation of the particulate phase. In ice confections the particles are ice crystals within the matrix and thus contiguity of the ice is defined as;

$$C_{ii} = \frac{A_{ii}}{(A_{ii} + A_{im})}$$

where $C_{ii}$ is the contiguity, $A_{ii}$ is the total interfacial surface area of ice-ice interfaces and $A_{im}$ is the interfacial surface area of ice-matrix interfaces. Contiguity can be measured from microstructural images of random planar surfaces cut through the material. Cryo-SEM images of flat fracture surfaces of unaerated ice confection are sufficient for this.

By placing an array of lines on the image of the microstructure, the number of intercepts of these lines with ice-ice and ice-matrix interfaces are counted and combined in the following equation, to give the contiguity;

$$C_{ii} = \frac{2N_{ii}}{(2N_{ii} + N_{im})}$$

where $N_{ii}$=number per unit length of ice-ice intercepts and $N_{im}$=number per unit length of ice-matrix intercepts.

Ideally, approximately 800 interfaces were counted from a total of 5 images that are representative of each sample's structure.

To determine contiguity, two sets of measurements were taken from each image. After placing a regular set of lines onto the image, the number of intercepts of the ice-matrix and ice-ice interfaces with these lines were counted, only including all obvious ice-ice interfaces. The count was then repeated, but this time with all possible ice-ice interfaces included. As such, a maximum ice contiguity measurement and a minimum ice contiguity measurement was made for each image. The mean of these figures is then taken as the contiguity value.

Example 5
Measurement of Euler-Poincare Characteristic

The Euler-Poincare characteristic is measured using microstructural images of the ice confection using cryogenic scanning electron microscopy (SEM). Structures are imaged using the technique described in "A low temperature scanning electron microscopy study of ice cream. I. Techniques and general microstructure" Food Structure Vol. 11 (1992), pp 1–9.

In a two-phase composite structure, the degree of continuity of one phase can be measured using the Euler-Poincare characteristic. The lower the value of the Euler-Poincare characteristic for a phase, the more continuous or connected that phase is within the microstructure. The Euler-Poincare characteristic can be a positive or negative number. The definition of the Euler-Poincare characteristic is given in "Unbiased estimation of the Euler-Poincare characteristic" by B. P. Pinnamaneni, C. Lantuejoul, J. P. Jernot and J. L. Chermant, Acta Sterelogica, 1989, 8/2, p101–106.

To measure the Euler-Poincare characteristic for ice in ice confections, identification of the ice and matrix phases on the micro-structural images was performed and using an image analysis system, the ice phase Euler-Poincare characteristic was determined using a specifically written analysis program. Whenever contrast in the images was insufficient for the image analysis system to automatically distinguish ice and matrix separately, the interface between the two was identified manually, thus enabling accurate determination of the Euler-Poincare characteristic.

The Euler-Poincare characteristic can be measured for ice in an ice confection produced by any processing route.

Example 6
Aspect Ratio Measurement

Samples were equilibrated at −18° C. in a Prolan environmental cabinet for approximately 12 hours. Microscopic slides were prepared by smearing a thin layer of ice confection from the centre of thin glass plates.

Each slide was transferred to a temperature controlled microscopic stage (at −18° C.) where images of ice crystals (about 400 individual ice crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest diameter (length), shortest diameter (breadth), the aspect ratio (length/breadth).

The average aspect ratio for the crystals was calculated.

Example 7

Production of a "gobstopper" product having different coloured and flavored water ice layers sequentially built up around an ice cream core. The use of water ice composition according to the invention provides a product which is very hard and forces the consumer to lick, rather than bite, the product and so each water ice layer is gradually revealed.

Further, the layers of water ice remain discrete and little or no colour "bleed" between layers is observed.

An unaerated sphere of ice cream (20–30 mm in diameter) having the following formulation was moulded onto a stick as follows;

| Ice cream composition | |
| --- | --- |
|  | % (weight) |
| Double Cream | 26.5 |
| Skimmed Milk Powder | 9.2 |
| Sucrose | 16.0 |
| Water | to 100 |

The ice cream pre-mix was poured into an aluminium mould and the mould was cooled in a blast freezer at −35° C. When the ice cream pre-mix was partially frozen a stick was inserted. When totally frozen the ice cream was demoulded by spraying the outside of the mould with water at 50° C.

The ice cream core was pre-cooled by immersion in solid $CO_2$ (dry ice) for approximately 2 minutes then dipped into a water ice mix having the following formulation;

| Water Ice Composition | |
| --- | --- |
|  | % (weight) |
| Sucrose | 15.0 |
| Dextrose | 5.0 |
| Locust Bean Gum | 0.25 |
| Citric Acid | 0.5 |
| Flavour/Colour | 0.2 |
| Type III AFP* | 0.005 |
| Water | to 100 |

*as described in WO 97/02343
Total Solids; 20.5%
Ice Content at −18° C.; 68.0% by weight Preparation of the Water Ice Mix All the water ice ingredients except AFP were mixed together using a high shear mixer for approximately 3 minutes. The water was added at a temperature of 80° C. The temperature of the water ice mix was approximately 55–65° C. after mixing.

The AFP was then added, and mixed for approximately 30 seconds in with the hot mix.

The mix was then passed through to a plate heat exchanger for pasteurisation at 81° C. for 25 seconds. The mix was then cooled to approximately 4° C. in the plate heat exchanger prior to use.

The product was then sequentially dipped into water ice mix to build up a number of layers (typically from 12 to 15) of different colours and flavours. Between each dip into the water ice mix the product was cooled in dry ice to facilitate pick-up of the next water ice layer.

The resulting product was a sphere of approximately 3–5 cm diameter.

Example 8

Water ice analogues of boiled sweets utilising the hard brittle texture of water ice according to the invention.

A water ice mix having the following formulation was prepared as in Example 7;

| Sucrose | 15.0 |
| --- | --- |
| Dextrose | 5.0 |
| Locust Bean Gum | 0.25 |
| Citric Acid | 0.5 |
| Flavour/Colour | 0.2 |
| Type III AFP* | 0.005 |
| Water | Balance |

*as described in WO 97/02343
Total Solids; 20.5% by weight
Ice Content at −18° C.; 68.0% by weight The water ice composition was dosed into rubber or plastic moulds and frozen quiescently in a blast freezer at −35° C.

Example 9, Comparative Examples Δ to C

An ice cream composition was prepared having the following formulation;

|  | weight % |
| --- | --- |
| Sucrose | 13.000 |
| Skimmed Milk Powder | 10.000 |
| Butter fat | 8.000 |
| Maltodextrin 40 | 4.000 |
| Monoglyceryl Palmitate (MGP) | 0.300 |
| Locust Bean Gum | 0.144 |
| Carageenan L100 | 0.016 |
| Flavour | 0.012 |
| Water | to 100 |

Total Soluble solids; 35% by weight
Ice content at −18° C.; 54% by weight

All the ice cream ingredients were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix at a concentration of 0.0025% by weight.

The ice cream pre-mix was then frozen using a Technohoy MF 75 scraped surface heat exchanger such that the following overruns (volume fraction of air ($V_{air}$) were obtained;

Example 9—No overrun (0)
Comparative Example A—43% overrun (0.3)
Comparative Example B—67% overrun (0.4)
Comparative Example C—100% overrun (0.5)

The ice cream was extruded at a temperature of from −4.4° C. to −5.4° C. The product was then hardened in a blast freezer at −35° C., then stored at −25° C.

The apparent elastic modulus and the flexure strength were determined using a four point bend test as described in Example 1.

Figure 3:
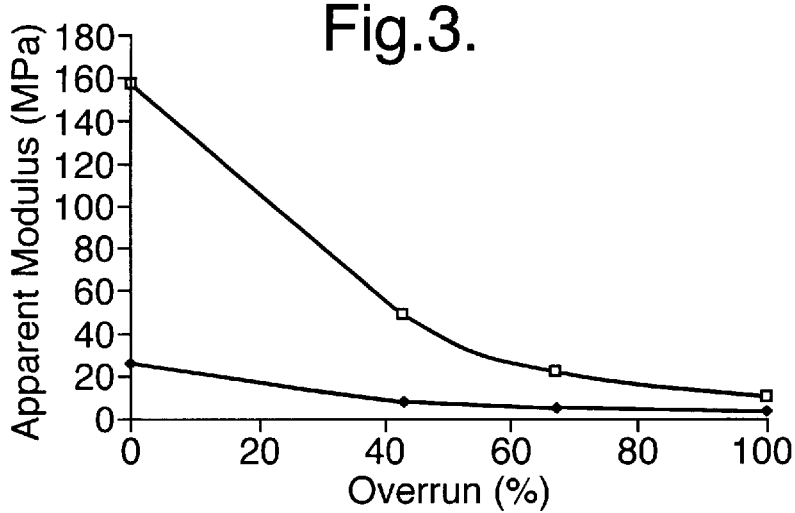
In FIGS. 3 to 11, AFP containing examples are shown by (□), control samples containing no AFP are shown by (♦)
Figure 4:
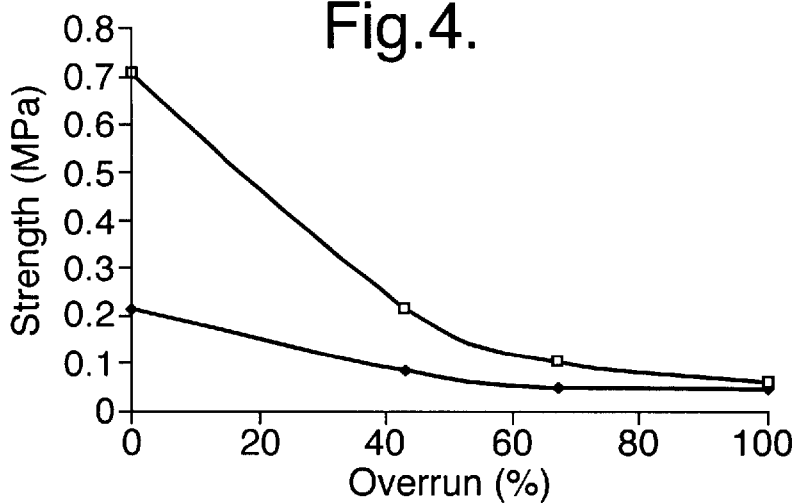

Results were compared with relevant control samples containing no AFP. Results are shown in FIGS. 3 and 4 where AFP containing examples are shown by (□) and control samples containing no AFP are shown by (♦).

Δ modulus, Δ modulus/original modulus, Δ strength and Δ strength/original strength were calculated. Results are shown in Table 1.

Figure 5:
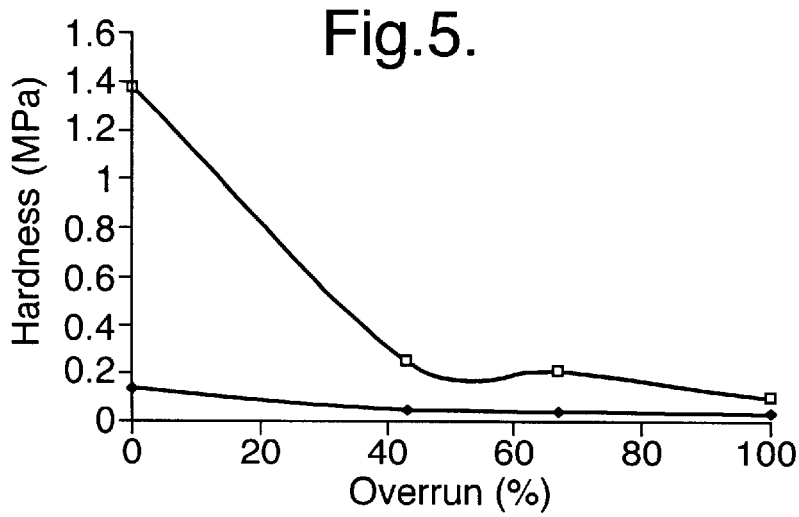

The Vickers Hardness was also determined using the method given in Example 3 results are shown in FIG. 5 where AFP containing examples are shown by (□) and control samples containing no AFP are shown by (♦).

$\Delta H_v/H_{v\ orig}$ and $\Delta H_v$ were calculated. Results are shown in Table 1.

TABLE 1

| Example | $\Delta E$ (MPa) | $\Delta E/E_{orig}$ | $\Delta\sigma_u$ (MPa) | $\Delta\sigma_u/\sigma_{u\ orig}$ | $\Delta H_v$ (MPa) | $\Delta H_v/H_{v\ orig}$ |
|---|---|---|---|---|---|---|
| 9 | 132 | 5.1 | 0.5 | 2.3 | 1.25 | 9.02 |
| A | 40 | 4.7 | 0.1 | 1.5 | 0.2 | 4.0 |
| B | 17 | 3.3 | 0.05 | 1.1 | 0.15 | 4.3 |
| C | 6.6 | 1.6 | 0.02 | 0.4 | 0.05 | 2.1 |

Examples 10–13

A water ice solution having the following composition was prepared as follows;

|  | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

All the water ice ingredients were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the water ice solution in the following concentrations;

Example 10—0.0005%
Example 11—0.0011%
Example 12—0.0025%
Example 13—0.005%

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

The apparent elastic modulus and the flexure strength were determined using a four point bend test as described in Example 1.

Figure 6:
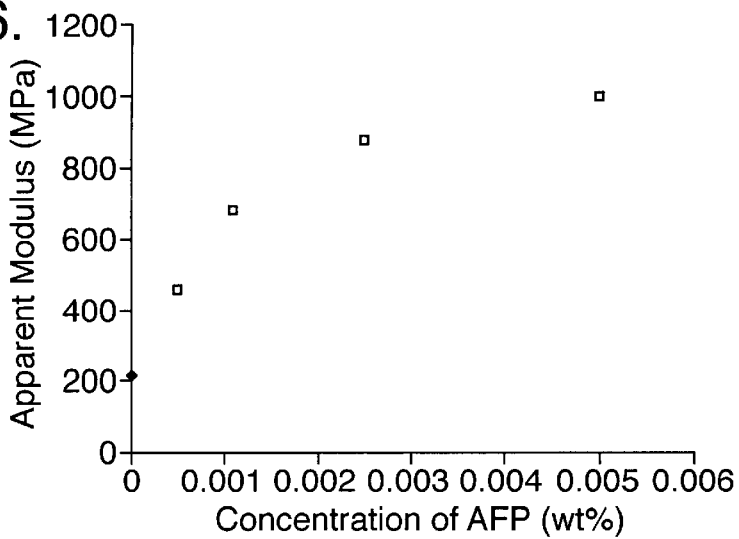
Figure 7:
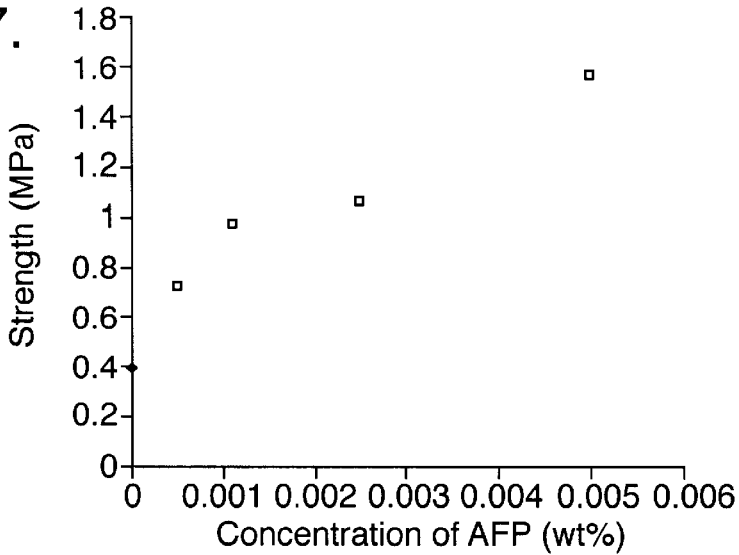

Results were compared with a control sample containing no AFP. Results are shown in FIGS. 6 and 7 where AFP containing examples are shown by (□) and control samples containing no AFP are shown by (♦).

$\Delta$ modulus, $\Delta$ modulus/original modulus, $\Delta$ strength and $\Delta$ strength/original strength were calculated. Results are shown in Table 2.

Figure 8:
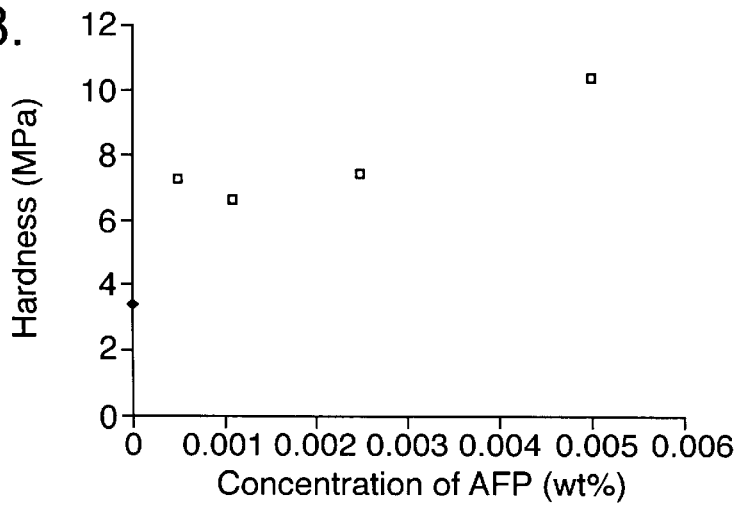

The Vickers Hardness was also determined using the method given in Example 3 results are shown in FIG. 8 where AFP containing examples are shown by (□) and control samples containing no AFP are shown by (♦).

$\Delta H_v/H_{v\ orig}$ and $\Delta H_v$ were calculated. Results are shown in Table 2.

TABLE 2

| Example | $\Delta E$ (MPa) | $\Delta E/E_{orig}$ | $\Delta\sigma_u$ (MPa) | $\Delta\sigma_u/\sigma_{u\ orig}$ | $\Delta H_v$ (MPa) | $\Delta H_v/H_{v\ orig}$ |
|---|---|---|---|---|---|---|
| 10 | 243 | 1.14 | 0.3 | 0.8 | 3.8 | 1.1 |
| 11 | 471 | 2.2 | 0.6 | 1.5 | 3.2 | 0.9 |
| 12 | 662 | 3.1 | 0.7 | 1.7 | 4.0 | 1.2 |
| 13 | 785 | 3.7 | 1.2 | 3.0 | 7.0 | 2.0 |

Examples 14–17

A water ice solution having the following composition was prepared;

|  | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

All the water ice ingredients were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the water ice solution in the following concentrations;

Example 14—0.0005%
Example 15—0.0011%
Example 16—0.0025%
Example 17—0.005%

The water ice solution was then quiescently frozen. The water ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus and the flexure strength were determined using a four point bend test as described in Example 1.

Figure 9:
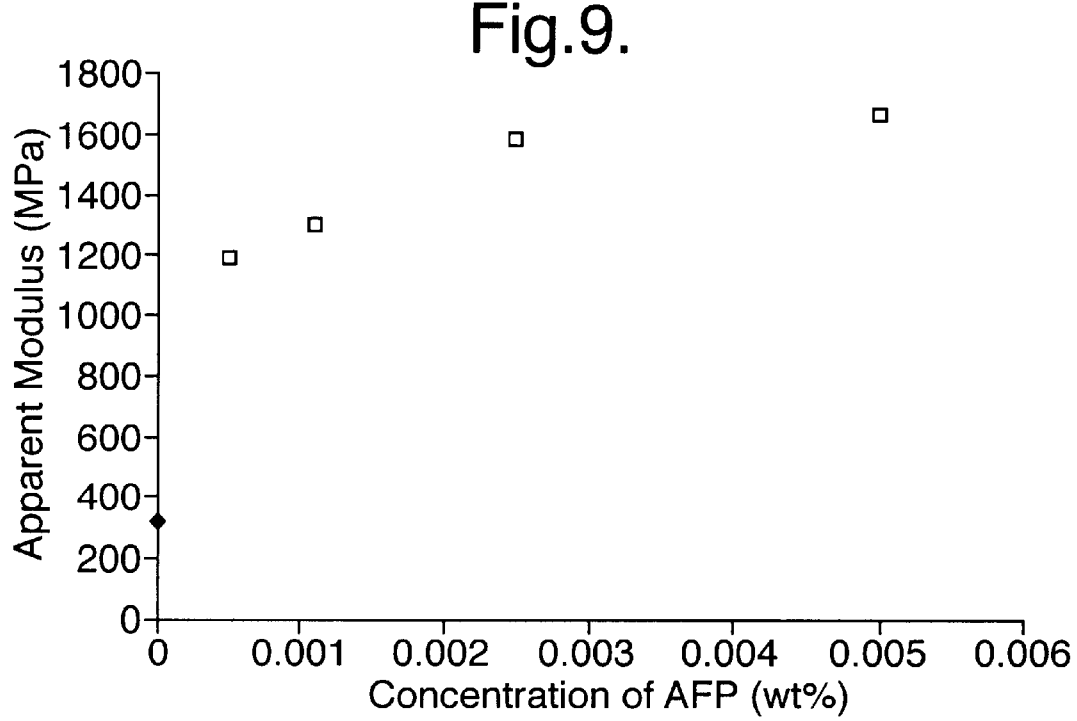
Figure 10:
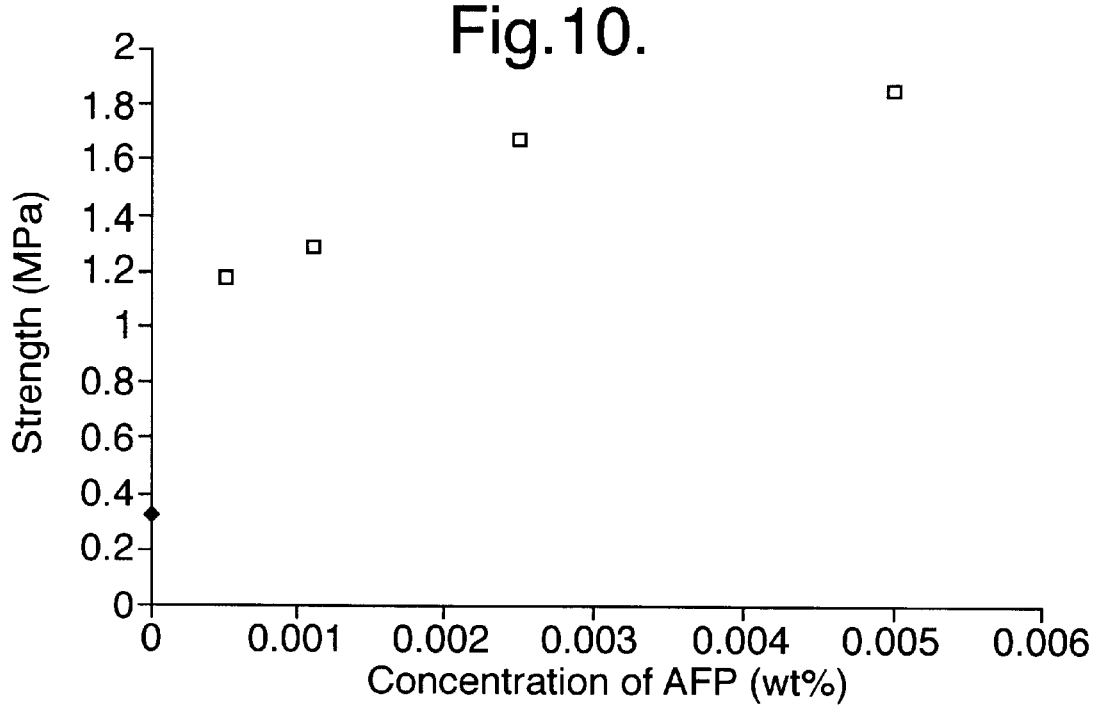

Results were compared with a control sample containing no AFP. Results are shown in FIGS. 9 and 10 where AFP containing examples are shown by (□) and control samples containing no AFP are shown by (♦).

$\Delta$ modulus, $\Delta$ modulus/original modulus, $\Delta$ strength and $\Delta$ strength/original strength were calculated. Results are shown in Table 3.

TABLE 3

| Example | $\Delta E$ (MPa) | $\Delta E/E_{orig}$ | $\Delta\sigma_u$ (MPa) | $\Delta\sigma_u/\sigma_{u\ orig}$ |
|---|---|---|---|---|
| 14 | 871 | 2.7 | 0.85 | 2.7 |
| 15 | 985 | 3.1 | 0.96 | 3.0 |

TABLE 3-continued

| Example | ΔE (MPa) | ΔE/ $E_{orig}$ | Δ$σ_u$ (MPa) | Δ$σ_u$/ $σ_{u\ orig}$ |
|---|---|---|---|---|
| 16 | 1269 | 4.0 | 1.4 | 4.2 |
| 17 | 1347 | 4.2 | 1.5 | 4.8 |

Examples 18 & 19, Comparative Example D

A water ice solution having the following composition was prepared as follows;

| | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

All the water ice ingredients were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the water ice solution in the following concentrations;

Example 18—0.0005% by weight
Example 19—0.005% by weight
Comparative Example D—no AFP The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

Contiguity was measured as in Example 4.
Results are shown in Table 4.

TABLE 4

| Example | Contiguity |
|---|---|
| 18 | 0.24 |
| 19 | 0.22 |
| D | 0.11 |

Example 20

A water ice solution having the following composition was prepared as follows;

| Water Ice Formulation | |
|---|---|
| | % (w/w) |
| Sucrose | 10.0 |
| Glucose | 5.0 |
| Locust Bean Gum | 0.2 |
| Citric Acid | 0.5 |
| AFP* | 0.005 |
| Colour/Flavour | 0.2 |
| Water | to 100 |

*as described in WO 97/02343

All the water ice ingredients except AFP were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4 ° C. in the plate heat exchanger prior to use.

The mix was then portioned into two halves, and AFP added to one half.

Simple water ice monobites (AFP and non-AFP) were then manufactured as follows;

10 ml portions of water ice mix were aliquoted into latex ice cube moulds (hemispherical shape). These were frozen for 2 hours in a blast freezer at −35° C. The moulds were then transferred to a cold store at −25° C. overnight prior to demoulding. Once demoulded, the monobites were stored in sealed plastic tubs in a cold store at −25° C. Prior to assessment the water ice monobites were equilibrated to −18° C. overnight. All sensory analysis was carried out at −18° C.

Sensory Methodology

The products were assessed by a highly trained sensory panel.

A Descriptive Analysis methodology was used whereby trained panelists identified and quantified the main sensory properties of water ices with and without AFP. The basic features which this method involves are given in Sensory Evaluation Techniques, $2^{nd}$ Edition (1991) M Meilgaard, G. V Civille and B. T. Carr, CRC Press, and include:

The development of the sensory descriptors by the panel, referred to hereafter as the attribute profile.

Consensus agreement of common scores on each sensory attribute of a 'control' product.

Assessment of some commercial and experimental samples to monitor panel performance prior to the paneling of all the experimental samples.

All tasting sessions are carried out in individual booths, in a controlled environment to eliminate bias from external variables.

Analysis of data via Analysis of Variance (ΔNOVA) with Duncan's Multiple Range comparison test to check for statistically significant (p=<0.05) differences between samples.

Sensory Results are shown in Table 5 in which product 1 is the control water ice with no AFP and product 2 is the water ice having 0.005% of Type III AFP Sensory Mean Scores are listed.

LSD=Least Significant Difference (indicates minimum difference between mean scores for a significant difference for that attribute).

TABLE 5

| Sensory Attribute | Product 1 | Product 2 | LSD |
|---|---|---|---|
| Hardness | 5.63 | 9.97 | 0.78 |
| Squeakiness | 7.94 | 5.35 | 1.05 |
| Crumbliness | 5.33 | 3.51 | 1.19 |
| Brittleness | 5.56 | 7.96 | 1.00 |
| Density | 3.90 | 8.02 | 1.05 |
| Crunchiness | 7.72 | 9.10 | 0.87 |
| Ice Crystal Detectability | 8.07 | 3.56 | 1.08 |
| Ice Crystal Size | 7.10 | 2.84 | 1.06 |
| Roughness | 6.50 | 4.92 | 0.96 |
| Rate of Melt | 6.67 | 3.96 | 0.93 |

The water ice with AFP was perceived to be harder, more brittle, denser, more crunchy, less squeaky, less crumbly, with less ice crystals (detection and size), less rough, and have a slower rate of melt in mouth than the water ice with no AFP.

Definition of Sensory Attributes

Hardness

The effort required to bite through the sample using the side teeth (1 st bite)

Squeakiness

The degree to which the sample emits a high pitched squeaking noise when the sample is first bitten Crumbliness The degree to which the samples breaks into small, rounded particles when first bitten Brittleness The degree to which the sample fractures/shears when first bitten Density The degree to which the sample is perceived to be closely packed, without any air spaces (dense) when first bitten Crunchiness The amount of noise perceived (squeaky, crunchy) during 3 chews with the side teeth Ice Crystal Detectability The amount of splintery ice crystals detected after 3 chews with the side teeth (assessed by rubbing the sample with the tongue)

Ice Crystal Size

The size of ice crystals detected after 3 chews, assessed by rubbing the sample with the tongue Roughness The degree to which the sample feels abrasive and coarse after 3 chews with the side teeth Rate of Melt The speed with which the sample can be broken down to a liquid by the side teeth

Example 21

Comparison of Time Taken to Consume a Water Ice Product with or without AFP

Water Ice Preparation

A water ice solution having the following composition was prepared as follows;

| | % (w/w) |
|---|---|
| Sucrose | 14.0 |
| Glucose | 6.0 |
| Stabiliser | 0.13 |
| Citric Acid | 0.3 |
| AFP* | 0.067 |
| Colour/Flavour | 0.3 |
| Water | to 100 |

*as described in WO 97/02343

All the water ice ingredients except AFP were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and AFP added to one half.

Production of Water Ice Stick Products

Simple water ice stick products of approximately 60 g were manufactured using conventional water ice moulding technology. Briefly, stainless steel moulds were filled with liquid mix then placed in a glycol bath at approximately −30° C. When the mix had frozen sufficiently sticks were inserted and the mix allowed to freeze completely. Products were demoulded by warming the mould exterior in warm water (ca. 50° C.) for approximately 30s and extracting the products from the mould using the stick.

Products were then wrapped in waxed paper wrappers and stored at −25° C. until use. Prior to consumption, products were equilibrated to −18° C. overnight.

Consumption of Water Ices

Untrained volunteers were asked to consume either a control or an AFP water ice. Products were selected at random. They were timed whilst doing this and the time taken for the entire product to be consumed was recorded. A week later, the same volunteers were asked to consume whichever product they had not consumed the previous week, and again timed. All products were labeled with batch codes and presented in plain wrappers.

The number of volunteers in the study was 41.

Figure 11:
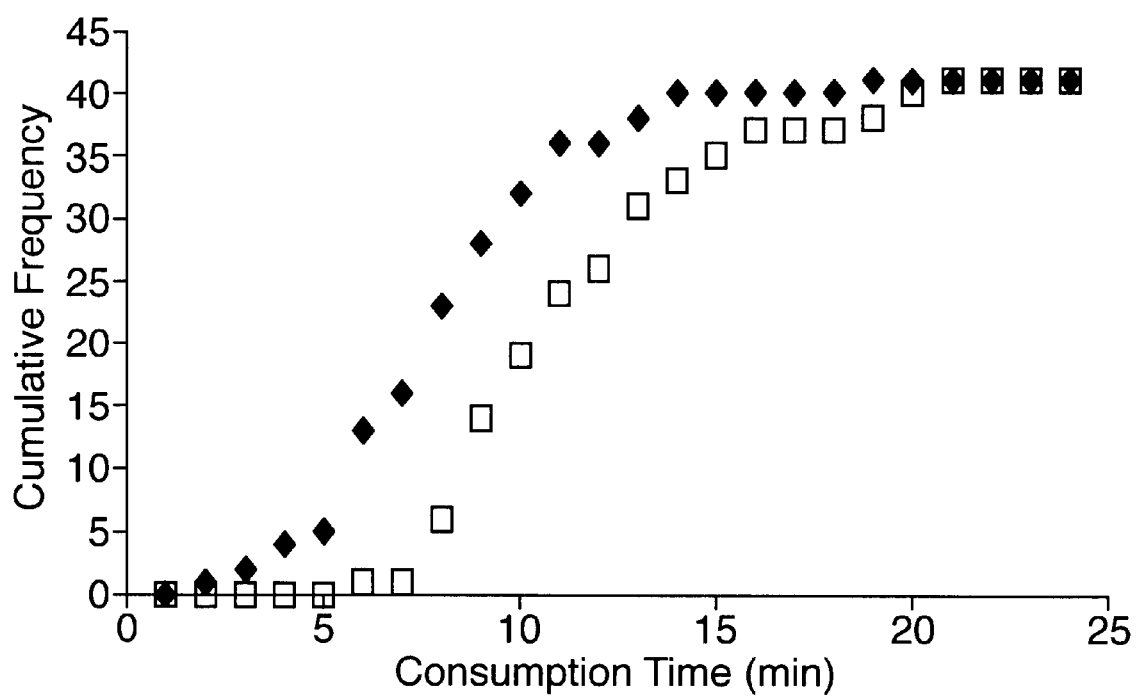

Results are shown in FIG. 11. The Mean time for Control Water Ice Consumption was 8.4 minutes (Standard Deviation=0.5). The Mean Time for AFP Water Ice Consumption was 11.8 minutes (Standard Deviation=0.6).

Example 22 Comparative Example E

An ice cream composition was prepared having the following formulation;

| | Weight % |
|---|---|
| Sucrose | 13.000 |
| Skimmed Milk Powder | 10.000 |
| Butter fat | 8.000 |
| Maltodextrin 40 | 4.000 |
| MGP | 0.300 |
| Locust Bean Gum | 0.144 |
| Carageenan L100 | 0.016 |
| Flavour | 0.012 |
| Water | to 100 |

Total soluble solids; 35% by weight
Ice content at −18° C.; 54% by weight

All the ice cream ingredients were mixed together using a high shear mixer for approximately 3 minutes. The water was added at a temperature of 80° C. The temperature of the water ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 22—0.005% by weight

Comparative Example E—no AFP

The ice cream pre-mix was then frozen using a Technohoy MF 75 scraped surface heat exchanger, no overrun was introduced into the ice cream. The ice cream was extruded at a temperature of from −4.4 to −5.4° C. The product was then hardened in a blast freezer at −35° C., then stored at −25° C.

The Euler-Poincare characteristic was measured in Example 5.

Results are shown in Table 6

TABLE 6

| Example | Euler-Poincare characteristic (mm$^{-2}$) |
| --- | --- |
| 22 | −577 |
| E | 339 |

Example 23, Comparative Example F

A water ice solution having the following composition was prepared as follows;

| | Weight % |
| --- | --- |
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 13.

After pasteurisation Type III AFP (as described in WO 97/02343) was added to the water ice solution in the following concentrations;

Example 23—0.005% by weight

Comparative Example F—no AFP

The water ice solution was frozen quiescently as described in Example 17 with no overrun being introduced.

The Euler-Poincare characteristic was measured as in Example 5.

Results are shown in Table 7

TABLE 7

| Example | Euler-Poincare characteristic (mm$^{-2}$) |
| --- | --- |
| 23 | −383 |
| F | 4.3 |

Example 24

A milk ice solution having the following composition was prepared as follows;

| | % (w/w) |
| --- | --- |
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |
| AFP* | 0.005 |
| Water | to 100 |

*as described in WO 97/02343

All the milk ice ingredients except AFP were mixed together using a high shear mixer for approximately 3 minutes. The water was added at a temperature of 80° C. The temperature of the milk ice mix was approximately 55–65° C. after mixing.

The mix was then homogenized (2000 psi) passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) added to one half.

The milk ice solutions were then quiescently frozen. The milk ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus and the flexure strength were determined using a four point bend test as described in Example 1.

Results for the milk ice containing AFP were compared with the control sample containing no AFP.

α modulus, Δ modulus/original modulus, Δ strength and Δ strength/original strength were calculated. Results are shown in Table 8.

TABLE 8

| Example | ΔE (MPa) | ΔE/E$_{orig}$ | Δσ$_u$ (MPa) | Δσ$_u$/σ$_{u\ orig}$ |
| --- | --- | --- | --- | --- |
| 24 | 756 | 16.2 | 1.81 | 6.68 |

Example 25

A milk ice solution having the following composition was prepared as follows;

| | % Weight |
| --- | --- |
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |

-continued

|  | % Weight |
|---|---|
| AFP* | 0.005 |
| Water | to 100 |

*as described in WO 97/02343

All the milk ice ingredients except AFP were mixed together using a high shear mixer for approximately 3 minutes. The water being added at a temperature of 80° C. The temperature of the milk ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) added to one half.

The milk ice solutions were frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C. The apparent elastic modulus and the flexure strength were determined using a four point bend test as described in Example 1.

Results for the milk ice containing AFP were compared with the control sample containing no AFP.

$\Delta$ modulus, $\Delta$ modulus/original modulus, $\Delta$ strength and $\Delta$ strength/original strength were calculated. Results are shown in Table 9.

TABLE 9

| Example | $\Delta E$ (MPa) | $\Delta E/E_{orig}$ | $\Delta\sigma_u$ (MPa) | $\Delta\sigma_u/\sigma_{u\ orig}$ |
|---|---|---|---|---|
| 25 | 290 | 5.08 | 0.968 | 4.17 |

Example 26

An ice cream composition was prepared having the following formulation;

|  | weight % |
|---|---|
| Sucrose | 13.500 |
| Skimmed Milk Concentrate (30% solids) | 24.000 |
| Cream (40% fat) | 43.000 |
| Egg Yolk (unsweetened) | 4.500 |
| Vanilla flavour | 1.000 |
| Water | to 100 |

Total soluble solids; 45% by weight
Ice content at −18° C.; 46% by weight

All the ice cream ingredients were mixed together using a high shear mixer for approximately 3 minutes. The water being added at a temperature of 80° C. The temperature of the ice cream mix was approximately 38–45° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type I AFP (from AF Protein) was added to the ice cream pre-mix in the following concentration;

Example 26—0.001% by weight

The ice cream pre-mix was then frozen using a Technohoy MF 75 scraped surface heat exchanger with no overrun being introduced. The ice cream was extruded at a temperature of from −4.8° C. to −5.5C. The product was then hardened in a blast freezer at −35° C., then stored at −25° C.

The apparent elastic modulus and the flexure strength were determined using a four point bend test as described in Example 1.

Results were compared with relevant control sample containing no AFP.

$\Delta$ modulus, $\Delta$ modulus/original modulus, $\Delta$ strength and $\Delta$ strength/original strength were calculated. Results are shown in Table 10.

TABLE 10

| Example | $\Delta E$ (MPa) | $\Delta E/E_{orig}$ | $\Delta\sigma_u$ (MPa) | $\Delta\sigma_u/\sigma_{u\ orig}$ |
|---|---|---|---|---|
| 26 | 138 | 4.2 | 0.408 | 1.09 |

Example 27

A water ice solution having the following composition was prepared as follows;

|  | % by weight |
|---|---|
| Sucrose | 18 |
| Locust Bean Gum | 0.18 |
| Hydrolysed milk protein (Hyfoama DS**) | 0.1 |
| Grass AFP solution* | 30.0 |
| water | to 100 |

*as described in WO 98/04699. The amount of grass AFP solution used was determined by the minimum amount required to provide the recrystallisation inhibition as defined by Example 2.
**Hyfoama DS is a trademark of Quest International
Total soluble solids; 18% by weight
Ice Content at −18° C.; 73% by weight A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

The AFP was added after pasteurisation.

The water ice solution was frozen in a Technohoy MF 75 scraped surface heat exchanger with no overrun introduced. The water ice was extruded at a temperature of from −2.6° C. to −3.6° C. The product was then hardened in a blast freezer at −35° C., then stored at −25° C.

The apparent elastic modulus and the flexure strength were determined using a four point bend test as described in Example 1.

Results were compared with the control sample containing no AFP.

$\alpha$ modulus, $\Delta$ modulus/original modulus, $\Delta$ strength and $\Delta$ strength/original strength were calculated. Results are shown in Table 11.

TABLE 11

| Example | ΔE (MPa) | ΔE/$E_{orig}$ | Δ$σ_u$ (MPa) | Δ$σ_u$/$σ_{u\ orig}$ |
|---|---|---|---|---|
| 27 | 230 | 0.84 | 0.615 | 1.03 |

Example 28

A water ice solution having the following composition was prepared as in Example 14;

A water ice solution having the following composition was prepared as follows;

| | % by weight |
|---|---|
| Sucrose | 18 |
| Locust Bean Gum | 0.18 |
| Hydrolysed milk protein (Hyfoama DS**) | 0.1 |
| Grass AFP solution* | 30.0 |
| water | to 100 |

*as described in WO 98/04699. The amount of grass AFP solution used was determined by the minimum amount required to provide the recrystallisation inhibition as defined by Example 2.
**Hyfoama DS is a trademark of Quest International
Total soluble solids; 18% by weight
Ice Content at −18° C.; 73% by weight A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation the AFP solution was added to the water ice solution.

The water ice solution was then quiescently frozen. The water ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus was determined using a four point bend test as described in Example 1.

Results were compared with the control sample containing no AFP.

Δ modulus and Δ modulus/original modulus were calculated. Results are shown in Table 12.

TABLE 12

| Example | ΔE (MPa) | ΔE/$E_{orig}$ |
|---|---|---|
| 28 | 146 | 2.59 |

What is claimed is:

1. An ice confection product having a volume of from 1 to 20 ml and a thickness of greater than 5 mm comprising an antifreeze protein, wherein Δ modulus/original modulus≧0.4, and/or Δ strength/original strength≧0.4; providing that when Δ modulus/original modulus≦6.0, Δ modulus≧50 MPa, and/or when Δ strength/original strength≦2.0, Δ strength≧0.2 MPa.

2. An ice confection according to claim 1, wherein the antifreeze protein is present at a concentration of from 0.0005% by weight to 0.005% by weight.

3. An ice confection according to claim 1, wherein the ice confection is unaerated.

4. An ice confection according to claim 1, wherein the ice confection is water ice or milk ice.

5. An ice confection product according to claim 1, wherein the antifreeze protein is chosen such that it gives an aspect ratio of more than 1.9 to the ice crystal.

6. An ice confection product according to claim 1, wherein the antifreeze protein is AFP Type III HPLC 12.

7. An ice confection product according to claim 1 having a contiguity of at least 0.2 and an ice content of from 50 to 90% by weight when measured at −18° C.

8. An ice confection product according to claim 1 having a Euler-Poincare characteristic of less than −150 mm$^{-2}$ and an ice content of from 50 to 90% by weight when measured at −18° C.

* * * * *